United States Patent
Hu et al.

(10) Patent No.: US 12,412,369 B2
(45) Date of Patent: Sep. 9, 2025

(54) LOW-DOSE PET IMAGE RESTORATION METHOD AND SYSTEM, DEVICE, AND MEDIUM

(71) Applicant: SHENZHEN INSTITUTES OF ADVANCED TECHNOLOGY, Shenzhen (CN)

(72) Inventors: Zhanli Hu, Shenzhen (CN); Hairong Zheng, Shenzhen (CN); Dong Liang, Shenzhen (CN); Yongfeng Yang, Shenzhen (CN); Xin Liu, Shenzhen (CN); Yingjie Xu, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 348 days.

(21) Appl. No.: 18/265,685

(22) PCT Filed: Dec. 8, 2020

(86) PCT No.: PCT/CN2020/134621
§ 371 (c)(1),
(2) Date: Jun. 7, 2023

(87) PCT Pub. No.: WO2022/120588
PCT Pub. Date: Jun. 16, 2022

(65) Prior Publication Data
US 2024/0046459 A1 Feb. 8, 2024

(51) Int. Cl.
*G06T 7/00* (2017.01)
*G06V 10/762* (2022.01)

(52) U.S. Cl.
CPC .......... *G06V 10/762* (2022.01); *G06T 7/0012* (2013.01); *G06T 2207/10088* (2013.01); *G06T 2207/10104* (2013.01)

(58) Field of Classification Search
CPC ............... G06V 10/762; G06T 7/0012; G06T 2207/10088; G06T 2207/10104
(Continued)

(56) References Cited

U.S. PATENT DOCUMENTS 9,734,601 B2 * 8/2017 Bresler ................. G06T 11/006
10,713,761 B2 * 7/2020 Lu ........................... G06V 10/30
(Continued)

FOREIGN PATENT DOCUMENTS

CN 106204674 A 12/2016
CN 109035356 A 12/2018
(Continued)

OTHER PUBLICATIONS

Yan Wang, et al., Semi-Supervised Tripled Dictionary Learning for Standard-dose PET Image Prediction using Low-dose PET and Multimodal MRI, IEEE Trans Biomed Eng., 2017, pp. 1-33, vol. 64, No. 3.

*Primary Examiner* — Allen H Nguyen
(74) *Attorney, Agent, or Firm* — Nitin Kaushik

(57) ABSTRACT

A low-dose PET image restoration method and system, a device, and a medium are provided. The method includes: S1, performing blocking processing on a training image comprising a low-dose PET image, an MR image, and a standard-dose PET image to obtain a first patch, and performing first preprocessing on the first patch to obtain a second patch; S2, obtaining, according to the second patch, a first joint dictionary by means of sparse coding and dictionary updating; and S3, restoring the low-dose PET image to a restored image of the standard-dose PET image according to the first joint dictionary.

16 Claims, 5 Drawing Sheets

(58) Field of Classification Search
USPC .......................................................... 382/131
See application file for complete search history.

(56) References Cited

U.S. PATENT DOCUMENTS

| | | | |
|---|---|---|---|
| 2016/0055658 A1* | 2/2016 | Liang | G06T 11/006 |
| | | | 382/131 |
| 2017/0221235 A1* | 8/2017 | De Man | G06F 18/28 |
| 2020/0118306 A1* | 4/2020 | Ye | G06T 11/008 |
| 2022/0351431 A1* | 11/2022 | Liu | G06N 3/0475 |
| 2023/0351559 A1* | 11/2023 | Spielman | G06T 5/50 |
| 2024/0046457 A1* | 2/2024 | Buckler | A61B 5/055 |

FOREIGN PATENT DOCUMENTS

| | | |
|---|---|---|
| CN | 109242865 A | 1/2019 |
| WO | 2016033458 A1 | 3/2016 |
| WO | 2019134879 A1 | 7/2019 |

\* cited by examiner

LOW-DOSE PET IMAGE RESTORATION METHOD AND SYSTEM, DEVICE, AND MEDIUM

CROSS REFERENCE TO THE RELATED APPLICATIONS

This application is the national phase entry of International Application No. PCT/CN2020/134621, filed on Dec. 8, 2020, the entire contents of which are incorporated herein by reference.

TECHNICAL FIELD

The present application relates to the field of Positron Emission Tomography (PET) image processing, in particular to a low-dose PET image restoration method and system, a device, and a medium.

BACKGROUND

PET/Magnetic Resonance (MR) large-scale functional metabolism and molecular imaging diagnostic equipment combining PET and Magnetic Resonance Imaging (MM) has functions of both PET and MRI, has advantages of high sensitivity, good accuracy, low radiation, and the like, and has obvious effect on the diagnosis of many diseases, especially tumors and cardiovascular and cerebrovascular diseases. A dose range of PET developer is 4.43 to 7.35 mSv, and an average dose is 5.89 mSv. A standard-dose of PET developer still exposes the human body to a certain amount of radiation, which increases the possibility of various diseases and affects human health under a cumulative effect. Therefore, reasonably reducing the dose of PET developer to make the dose below the dose range of PET developer can reduce the impact of radiation on the human body. Achieving restoration from a low-dose PET image to a standard-dose PET image is of great significance to the application of PET/MR technologies and medical diagnosis.

For the low-dose PET image, because the dose of developer is reduced during imaging, a lot of noise exists after imaging, and image details are lost. This seriously affects an imaging diagnosis effect of the PET/MR equipment on lesions of a patient. In addition, because a PET image has high resolution, an image restoration process has a large amount of calculation, the restoration process is complex, the restoration time is long, and the diagnosis efficiency is seriously affected.

The prior art generally has problems such as poor restoration effect, complex restoration process, and low restoration accuracy for low-dose PET image restoration. This causes problems such as poor quality of a restored image, long restoration time, and absence of restored image contents. Therefore, a restoration method for a low-dose PET image is required. The restoration method can solve the problems of serious noise and loss of details, and can improve image restoration efficiency and image restoration accuracy.

SUMMARY

Based on the problems in the prior art, the present application provides a low-dose PET image restoration method. The specific solution is as follows.

A low-dose PET image restoration method includes the following steps: S1, performing blocking processing on training images including a low-dose PET image, a Magnetic Resonance (MR) image, and a standard-dose PET image to obtain a first patch, and performing first preprocessing on the first patch to obtain a second patch; S2, obtaining a first joint dictionary by sparse coding and dictionary updating according to the second patch; and S3, restoring the low-dose PET image to a standard-dose PET restored image according to the first joint dictionary.

Further, the S2 further includes the following steps: S21, obtaining an initialized dictionary including a low-dose PET dictionary, an MR dictionary, and a standard-dose PET dictionary by taking the second patch as a sample; S22, constructing an initialized joint dictionary according to the initialized dictionary, and constructing a target matrix according to the second patch; and S23, obtaining a sparse code according to the target matrix, iteratively updating the sparse code and the initialized joint dictionary until an iteration stop condition is met, and obtaining the first joint dictionary including a first low-dose PET dictionary, a first MR dictionary, and a first standard-dose PET dictionary.

Further, in the S23, each iteration includes first updating the sparse code with the dictionary fixed, and then updating the dictionary with the sparse code fixed.

Further, in the S23, partial samples are randomly selected for sparse coding and dictionary updating in each iteration.

Further, the S3 further includes the following steps: S31, performing blocking processing on the low-dose PET image and the MR image to obtain a third patch, and performing second preprocessing on the third patch to obtain a fourth patch; S32, merging the first low-dose PET dictionary and the first MR dictionary obtained in the S2 into a second joint dictionary, and obtaining a second sparse code according to the fourth patch and the second joint dictionary; and S33, obtaining a prediction patch according to the first standard-dose PET dictionary and the second sparse code obtained in the S2, and restoring the prediction patch to a two-dimensional lattice to obtain the standard-dose PET restored image.

In particular, the first patch is a one-dimensional vector generated by randomly selecting an image block from a multi-frame image and extending the image block, and includes a first patch of the low-dose PET image, a first patch of the MR image, and a first patch of the standard-dose PET image. The first patch is at the same position of the multi-frame image.

In particular, the third patch, at a selected position, covers an entire image in an order of the multi-frame image.

In particular, in the S1, the first preprocessing includes mapping the first patch of the low-dose PET image and the first patch of the MR image to imaging space of the standard-dose PET image through a preset matrix to obtain a second patch of the low-dose PET image and a second patch of the MR image.

In particular, in the S31, the second preprocessing includes mapping a third patch of the low-dose PET image and a third patch of the MR image to imaging space of the standard-dose PET image through a preset matrix to obtain a fourth patch of the low-dose PET image and a fourth patch of the MR image.

In particular, the S21 includes using a K-means clustering algorithm to obtain K clustering centers as the initialized dictionary by taking the second patch as a sample, and performing normalization processing on the initialized dictionary.

Further, in the S22, expressions of the initialized joint dictionary and the target matrix are respectively:

$$D = \begin{bmatrix} Dl \\ Dr \\ Ds \end{bmatrix}, Y = \begin{bmatrix} Yl \\ Yr \\ Ys \end{bmatrix}$$

where D represents the initialized joint dictionary, Y represents the target matrix, Dl represents the low-dose PET dictionary, Dr represents the MR dictionary, Ds represents the standard-dose PET dictionary, Yl represents the second patch of the low-dose PET image, Yr represents the second patch of the MR image, and Ys represents the second patch of the standard-dose PET image.

Further, in the S23, an expression of the sparse coding includes:

$$\underset{X}{\operatorname{argmin}} \|Y - D\Lambda^{-1}\Lambda X\|_F^2 + \lambda \|\Lambda X\|_1$$

where X represents sparse coding, $\Lambda$ is a diagonal matrix, and a diagonal element of the diagonal matrix is $\Lambda^q = d^q - y_i$, here, $d^q$ is the $q^{th}$ atom of a dictionary D, and $y_i$ is the $i^{th}$ element of Y, and $\lambda$ represents a sparse constraint coefficient.

Further, in the S23, an expression of the dictionary updating includes:

$$\underset{D}{\operatorname{argmin}} \frac{1}{2} tr\left[D^T D\left(\sum_i x_i x_i^T + 2\mu \psi_i\right)\right] - tr\left[D^T\left(\sum_i y_i x_i^T + 2\mu y_i \bar{x}_i^T\right)\right]$$

where $y_i$ is the $i^{th}$ element of Y, $\bar{x}$ is an absolute value of each element of the sample x, $\psi_i$ is a diagonal matrix with $\bar{x}_i^T$ as a diagonal element, $y_i$ is the $i^{th}$ element of Y, and $\mu$ represents a sparse constraint coefficient.

Specifically, the expression of the dictionary updating is solved by a gradient descent method. An expression of the gradient descent method is:

$$d_q^{k+1} = d_q^k - \frac{1}{a_{qq}}(D^k a_q - b_q)$$

where $d^q$ is the $q^{th}$ atom of a dictionary D, k is the number of iterations, $a_q$ is an element of the $q^{th}$ column of $\Sigma_i x_i x_i^T + 2\mu \psi_i$, $b_q$ is an element of the $q^{th}$ column of $\Sigma_i y_i x_i^T + 2\mu y_i \bar{x}_i^T$, and $a_{qq}$ is an element of the $q^{th}$ row and the $q^{th}$ column of $\Sigma_i x_i x_i^T + 2\mu \psi_i$.

A low-dose PET image restoration system includes: a sample obtaining unit, configured to perform blocking processing on training images including a low-dose PET image, an MR image, and a standard-dose PET image to obtain a first patch, and perform first preprocessing on the first patch to obtain a second patch; a joint dictionary obtaining unit, configured to obtain a first joint dictionary by sparse coding and dictionary updating according to the second patch; and an image restoring unit, configured to restore the low-dose PET image to a standard-dose PET restored image according to the first joint dictionary.

Further, the joint dictionary obtaining unit further includes: an initializing unit, configured to obtain an initialized dictionary including a low-dose PET dictionary, an MR dictionary, and a standard-dose PET dictionary by taking the second patch as a sample; a constructing unit, configured to construct an initialized joint dictionary according to the initialized dictionary, and construct a target matrix according to the second patch; and an iteration unit, configured to obtain a sparse code according to the target matrix, iteratively update the sparse code and the initialized joint dictionary until an iteration stop condition is met, and obtain the first joint dictionary including a first low-dose PET dictionary, a first MR dictionary, and a first standard-dose PET dictionary.

In particular, the iteration unit further includes: an iteratively updating unit, configured to first update the sparse code with the dictionary fixed, and then update the dictionary with the sparse code fixed in each iteration; and a sample selecting unit, configured to randomly select partial samples to perform sparse coding and dictionary updating in each iteration.

A computer device includes: one or more processors; and a memory, configured to store one or more programs. When executed by the one or more processors, the one or more programs enable the one or more processors to implement the foregoing low-dose PET image restoration method.

A computer-readable storage medium has a computer program stored thereon. The program implements the foregoing low-dose PET image restoration method when executed by a processor.

The present application has the following beneficial effects.

In response to the problems of serious noise and loss of details of a low-dose PET image, the present application provides a low-dose PET image restoration method and system, a device, and a medium. The present application solves the common defects of poor image restoration effect, complex image restoration process, low image restoration accuracy, and the like in the prior art, can effectively solve the problems of serious noise and loss of details of a low-dose PET image, and improve image restoration efficiency and image restoration accuracy. The low-dose PET image restoration method is applied to a specific system, a computer device, and a computer storage medium. Embodying the method is of great significance to the development of the medical imaging.

In order to make the foregoing objectives, features, and advantages of the present application easy to understand, preferred embodiments with the accompanying drawings are described in detail below.

BRIEF DESCRIPTION OF THE DRAWINGS

In order to more clearly explain the technical solutions in the embodiments of the present application, the following will briefly introduce the accompanying drawings needed in the embodiments. It should be understood that the accompanying drawings show only some embodiments of the present application, and therefore should not be considered as a limitation on the scope. A person of ordinary skill in the art may still derive other related drawings from these accompanying drawings without creative efforts.

DETAILED DESCRIPTION OF THE EMBODIMENTS

Embodiment 1

Figure 1:
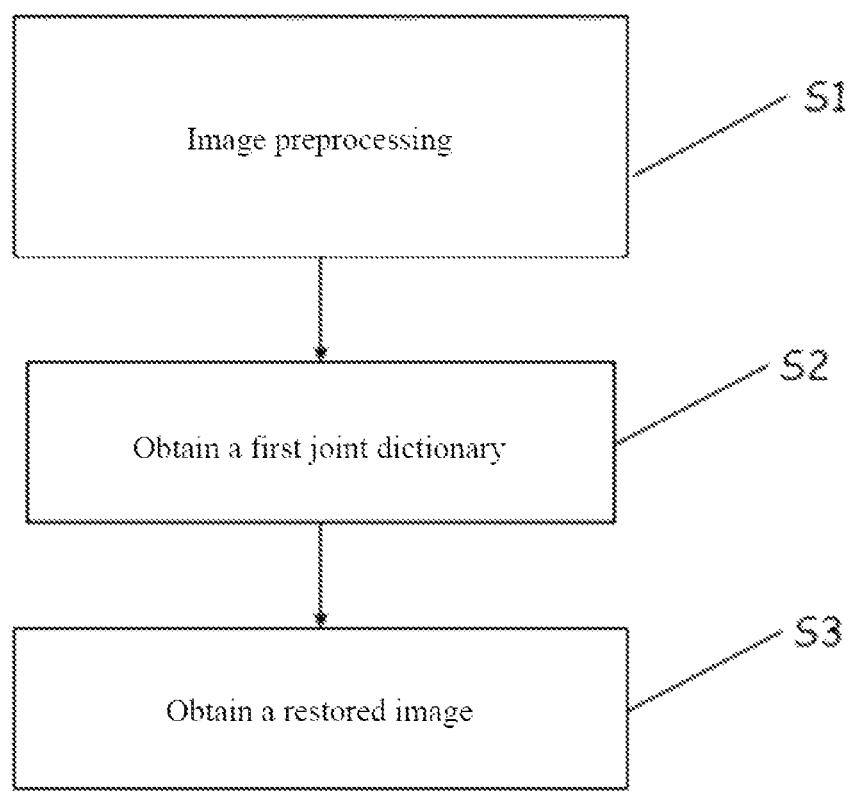
FIG. 1 is a flowchart of a low-dose PET image restoration method according to the present application.

In response to the problems of serious noise and loss of details of a low-dose PET image, this embodiment provides a low-dose PET image restoration method. The specific steps of the method are shown in FIG. 1 of the specification. The specific solution is as follows.

In S1, image preprocessing is performed. Specifically, blocking processing is performed on training images including a low-dose PET image, an MR image, and a standard-dose PET image to obtain a first patch, and first preprocessing is performed on the first patch to obtain a second patch.

In S2, a first joint dictionary is obtained. Specifically, a first joint dictionary is obtained by sparse coding and dictionary updating according to the second patch.

In S3, a restored image is obtained. Specifically, the low-dose PET image is restored to a standard-dose PET restored image according to the first joint dictionary.

Specifically, in the S1, the first patch is obtained from a training sample, and the first preprocessing is performed on the first patch to obtain the second patch. The training images for this embodiment include the low-dose PET image, the MR image, and the standard-dose PET image. The low-dose PET image is an image to be restored. The PET image is a group of continuous tomographic images of the human body. A plurality of single-frame images form a multi-frame image. In this embodiment, the first patch is obtained from the training images. The first patch is a one-dimensional vector generated by randomly selecting an image block from the multi-frame image and extending the image block. Because the first patch is randomly selected from the multi-frame image, and an overlap may exist, the overlap needs to be removed, and then the first patch is used as a sample to participate in training. In particular, a first patch of the low-dose PET image, a first patch of the MR image, and a first patch of the standard-dose PET image are obtained at the same position of the multi-frame image. Because imaging space of the low-dose PET image and the MR image is different from imaging space of the standard-dose PET image, the imaging space cannot be directly used for subsequent dictionary learning, and the first preprocessing needs to be performed on the first patch. The first preprocessing includes obtaining a mapping matrix M, and mapping the first patch of the low-dose PET image and the first patch of the MR image to the imaging space of the standard-dose PET image to obtain the first patch after mapping, namely, the second patch. The mapping matrix can enable mapping to have both accuracy and generality in a point-to-point manner, an edge-to-edge manner, and the like. The specific mapping matrix is expressed as:

$$f(Y) = M * Y$$

where Y is a first patch vector matrix, and M is the mapping matrix.

Specifically, in the S2, the first joint dictionary is mainly obtained. The S2 includes two main modules: sparse coding and dictionary updating. The dictionary is obtained by alternately performing the sparse coding and the dictionary updating. The S2 specifically includes the following steps.

Figure 2:
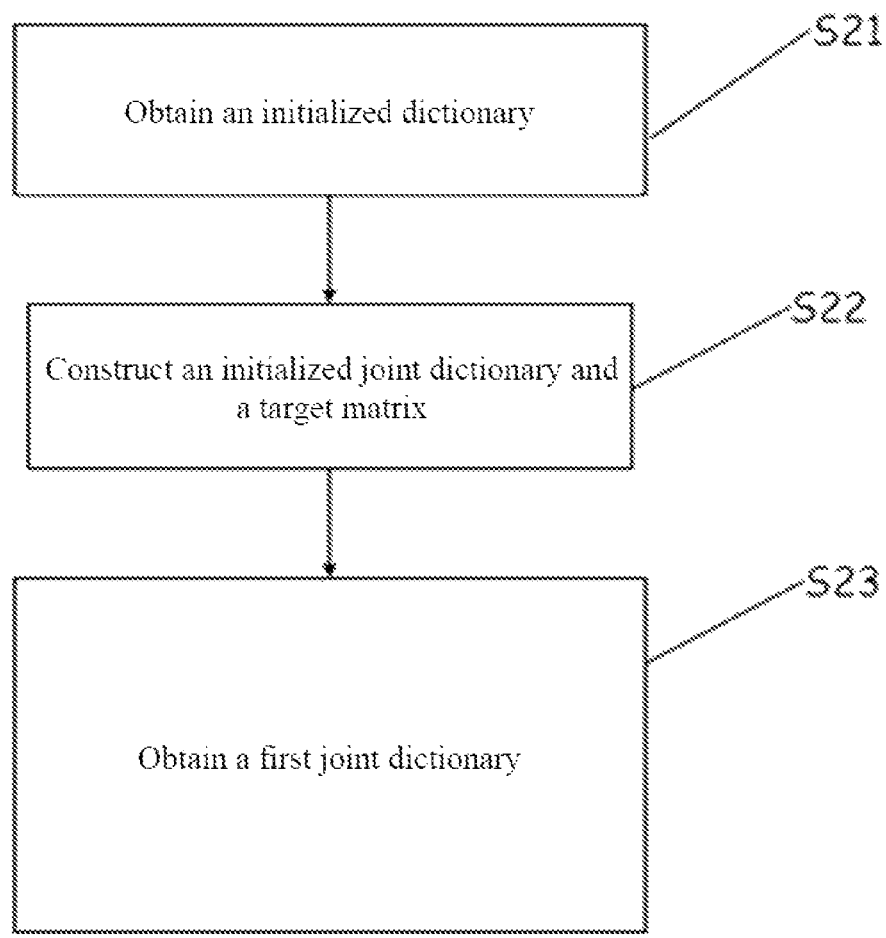
FIG. 2 is a specific flowchart of S2 of a low-dose PET image restoration method according to the present application.

In S21, an initialized dictionary is obtained. Specifically, an initialized dictionary including a low-dose PET dictionary, an MR dictionary, and a standard-dose PET dictionary is obtained by taking the second patch as a sample. In S22, an initialized joint dictionary and a target matrix are constructed. Specifically, an initialized joint dictionary is constructed according to the initialized dictionary, and a target matrix is constructed according to the second patch. In S23, a first joint dictionary is obtained. Specifically, a sparse code is obtained according to the target matrix, and the sparse code and the initialized joint dictionary are iteratively updated based on a K-Singular Value Decomposition (K-SVD) idea until an iteration stop condition is met. Each iteration includes first updating the sparse code with the dictionary fixed, and then updating the dictionary with the sparse code fixed. The obtained first joint dictionary includes a first low-dose PET dictionary, a first MR dictionary, and a first standard-dose PET dictionary. The specific steps of the S2 are shown in FIG. 2 of the specification. Preferably, Local Coordinate Coding (LCC) is used in this embodiment for dictionary learning. The specific expression is:

$$\underset{D,X}{\operatorname{argmin}} \sum_i \left( \frac{1}{2} \|y - Dx_i\|_F^2 + \lambda \sum_i |x_q| \|d_q - x_i\|^2 \right)$$

where X represents sparse coding, D represents a feature matrix (dictionary), $x_i$ represents a sparse coefficient of the $i^{th}$ sample, d represents a feature dimension of the feature dictionary, and q represents the $q^{th}$ column of the dictionary. The main purpose of dictionary learning is to obtain D.

In the S21, the initialized dictionary including the low-dose PET dictionary, the MR dictionary, and the standard-dose PET dictionary is obtained by taking the second patch as a sample. Specifically, by using a K-means clustering algorithm, K clustering centers are obtained as the initialized dictionary by taking the second patch as a sample. The initialized dictionary includes the low-dose PET dictionary, the MR dictionary, and the standard-dose PET dictionary. In addition, the initialized dictionary needs to be normalized, that is, normalization processing needs to be performed on the initialized dictionary.

In the S22, the initialized joint dictionary is constructed according to the initialized dictionary, and the target matrix is constructed according to the second patch. Expressions of the initialized joint dictionary D and the target matrix Y are:

$$D = \begin{bmatrix} Dl \\ Dr \\ Ds \end{bmatrix}, Y = \begin{bmatrix} Yl \\ Yr \\ Ys \end{bmatrix}$$

where Dl represents the low-dose PET dictionary, Dr represents the MR dictionary, Ds represents the standard-dose PET dictionary, Yl represents a second patch of the low-dose PET image, Yr represents a second patch of the MR image, and Ys represents a second patch of the standard-dose PET image.

In the S23, the sparse code and the dictionary are iteratively updated according to the K-SVD idea until an iteration stop condition is met. Each iteration includes first updating the sparse code with the dictionary fixed, and then updating the dictionary with the sparse code fixed.

For the sparse coding, an expression of the sparse coding related to the dictionary D and the target matrix Y is:

$$\underset{X}{\operatorname{argmin}} \|Y - D\Lambda^{-1}\Lambda X\|_F^2 + \lambda\|\Lambda X\|_1$$

where X represents sparse coding, $\Lambda$ is a diagonal matrix, and a diagonal element of the diagonal matrix is $\Lambda^q = d^q - y_i$, here, $d^q$ is the $q^{th}$ atom of the dictionary D, and $y_i$ is the $i^{th}$ element of Y, and $\lambda$ represents a sparse constraint coefficient. For the above formula, in this embodiment, a Matching Pursuits (MP) algorithm, an Orthogonal Matching Pursuit (OMP) algorithm, or a Least Absolute Shrinkage and Selection Operator (LASSO) algorithm is selected for solving.

For the dictionary updating, an expression of the dictionary updating related to the dictionary D and the target matrix Y is:

$$\underset{D}{\operatorname{argmin}} \frac{1}{2} tr\left[D^T D\left(\sum_i x_i x_i^T + 2\mu\psi_i\right)\right] - tr\left[D^T\left(\sum_i y_i x_i^T + 2\mu y_i \bar{x}_i^T\right)\right]$$

where $y_i$ is the $i^{th}$ element of Y, $\bar{x}$ is an absolute value of each element of the sample x, $\psi_i$ is a diagonal matrix with $\bar{x}_i^T$ as a diagonal element, $y_i$ is the $i^{th}$ element of Y, and $\mu$ represents a sparse constraint coefficient. For the above formula, in this embodiment, a gradient descent method is used for solving. The specific expression is as follows:

$$d_q^{k+1} = d_q^k - \frac{1}{a_{qq}}(D^k a_q - b_q)$$

where k is the number of iterations, $a_q$ is the $q^{th}$ column of $\Sigma_i x_i x_i^T + 2\mu\psi_i$, $b_q$ is an element of the $q^{th}$ column of $\Sigma_i y_i x_i^T + 2\mu y_i \bar{x}_i^T$, and $a_{qq}$ is an element of the $q^{th}$ row and the $q^{th}$ column of $\Sigma_i x_i x_i^T + 2\mu\psi_i$.

In this embodiment, the sparse code and the dictionary are iteratively updated based on the K-SVD idea until an iteration stop condition is met. Each iteration includes first updating the sparse code X with the dictionary D fixed, and then updating the dictionary D with the sparse code X fixed. The K-SVD idea is a classical dictionary training algorithm. SVD decomposition is performed on an error term according to a minimum error principle, a decomposition term that minimizes an error is selected as an updated dictionary atom and a corresponding atom coefficient, and an optimized solution is obtained through continuous iteration.

In particular, in this embodiment, an online learning manner is selected, that is, N samples are randomly selected for training in each iteration. Different from a manner of simultaneously iterating all training samples in the prior art, in this embodiment, by randomly selecting partial samples for iteration, a training speed is greatly improved on the basis of ensuring training accuracy, and then the time for the whole low-dose image restoration is reduced. Random selection of a sample for training ensures that the training accuracy will not vary due to chance. Selection of partial samples for training avoids repeated training of the samples, the time for iteration is greatly reduced, and the training efficiency is improved.

Specifically, in the S3, the low-dose PET image is restored to the standard-dose PET restored image according to the joint dictionary. The S3 includes the following specific steps. In S31, the blocking processing is performed on the low-dose PET image and the MR image to obtain a third patch, and second preprocessing is performed on the third patch to obtain a fourth patch. In S32, the first low-dose PET dictionary and the first MR dictionary obtained in the S2 are merged into a second joint dictionary, and a second sparse code is obtained according to the fourth patch and the second joint dictionary. In S33, a prediction patch is obtained according to the first standard-dose PET dictionary and the second sparse code obtained in the S2, and the prediction patch is restored to a two-dimensional lattice to obtain the standard-dose PET restored image.

In the S31, the blocking processing is performed on the low-dose PET image and the MR image to obtain the third patch, and the second preprocessing is performed on the third patch to obtain the fourth patch. A blocking method is the same as in the S1. An image block is randomly selected from the multi-frame image and extended to a one-dimensional vector to obtain the third patch. The third patch includes a third patch of the low-dose PET image and a third patch of the MR image. In particular, the third patch needs to be selected at a position where the third patch can cover an entire image in an order of the multi-frame image. In particular, an overlap may exist between the third patches, which may reduce a block effect of a result. Similarly, because the imaging space of the low-dose PET image and the MR image is different from the imaging space of the standard-dose PET image, the imaging space cannot be directly used for subsequent dictionary learning, and the second preprocessing needs to be performed on the third patch. The second preprocessing includes obtaining the mapping matrix M, and mapping the third patch of the low-dose PET image and the third patch of the MR image to the imaging space of the standard-dose PET image to obtain the third patch after mapping, namely, the fourth patch. The mapping matrix can enable mapping to have both accuracy and generality in a point-to-point manner, an edge-to-edge manner, and the like.

In the S32, the first low-dose PET dictionary and the first MR dictionary obtained in the S2 are merged into the second joint dictionary, and the corresponding second sparse code is obtained according to the second joint dictionary D and the fourth patch. The specific expression is as follows:

$$D = \begin{bmatrix} Dl \\ Dr \end{bmatrix}, Y = \begin{bmatrix} Yl \\ Yr \end{bmatrix}$$

where Dl represents the first low-dose PET dictionary, Dr represents the first MR dictionary, Yl represents the fourth patch of the low-dose PET image, and Yr represents the fourth patch of the MR image.

Finally, in the S33, the prediction patch is obtained according to the first standard-dose PET dictionary and the second sparse code, and the prediction patch is restored to the two-dimensional lattice to obtain the standard-dose PET restored image. A corresponding prediction patch is predicted through the first standard-dose PET dictionary and the second sparse code obtained in the S2, and the prediction patch is restored to a two-dimensional lattice to obtain a final standard-dose PET restored image. The final standard-dose PET restored image is a restored image of the low-dose PET image.

The method provided in this embodiment has compatibility and may also be applied to reconstruction of other types of medical images, such as a CT image. An image reconstruction effect can be improved with reference to a deep learning related method. In addition, the method provided in this embodiment has extremely strong advantages in noise reduction, and may also be applied to the related field of image denoising.

This embodiment provides a low-dose PET image restoration method. A low-dose PET image is restored through dictionary learning and a sparse matrix. After a dictionary is constructed, the dictionary is updated by using a corresponding algorithm to obtain a joint dictionary that is more suitable for restoring a standard-dose image. Restoration accuracy is improved with reference to an MR image. Meanwhile, an online learning related method is applied to sparse dictionary updating to improve a convergence speed, so that the time required by the whole image restoration process is greatly reduced, and image restoration efficiency is improved.

Embodiment 2

On the basis of Embodiment 1, this embodiment provides a low-dose PET image restoration system that modularizes the low-dose PET image restoration method in Embodiment 1. The specific solution is as follows.

Figure 3:
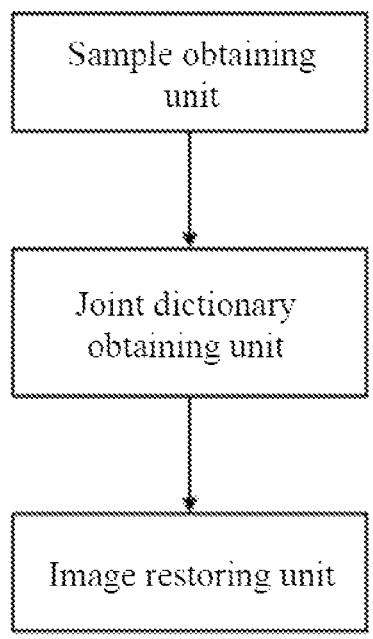
FIG. 3 is a block diagram of a low-dose PET image restoration system according to the present application.

A low-dose PET image restoration system includes: a sample obtaining unit, a joint dictionary obtaining unit, and an image restoring unit. The joint dictionary obtaining unit is connected to the sample obtaining unit and the image restoring unit separately. The system is shown in FIG. 3 of the specification.

Specifically, the sample obtaining unit is configured to perform blocking processing on training images including a low-dose PET image, an MR image, and a standard-dose PET image to obtain a first patch, and perform first preprocessing on the first patch to obtain a second patch. A user inputs the low-dose PET image as a sample through the sample obtaining unit. The sample obtaining unit obtains the first patch according to the training images. Mapping processing is performed on the first patch. A first patch of the low-dose PET image and a first patch of the MR image are mapped to imaging space of the standard-dose PET image through a mapping matrix M to obtain the first patch after mapping, namely, the second patch. The second patch is transferred to the joint dictionary obtaining unit.

Figure 4:
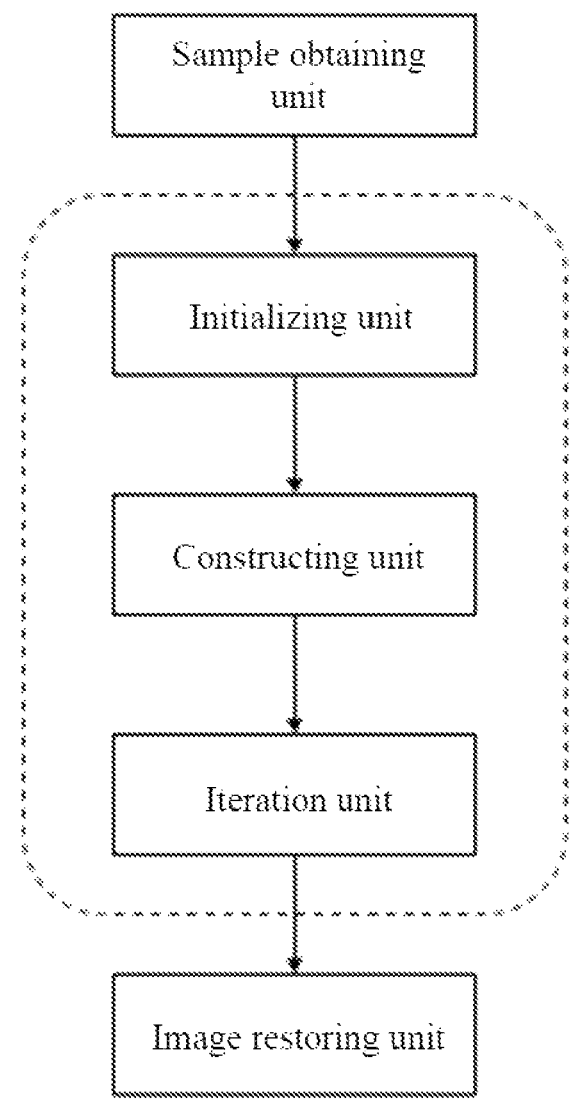
FIG. 4 is a specific block diagram of a low-dose PET image restoration system according to the present application.

Specifically, the joint dictionary obtaining unit is configured to obtain a first joint dictionary by sparse coding and dictionary updating. The joint dictionary obtaining unit mainly includes an initializing unit, a constructing unit, and an iteration unit. The constructing unit is connected to the initializing unit and the iteration unit separately, specifically shown in FIG. 4 of the specification.

Specifically, the initializing unit is configured to obtain an initialized dictionary including a low-dose PET dictionary, an MR dictionary, and a standard-dose PET dictionary by taking the second patch as a sample. The initializing unit receives the second patch transferred by the sample obtaining unit, uses a K-means clustering algorithm to obtain K clustering centers as the initialized dictionary by taking the second patch as a sample, and performs normalization processing on the initialized dictionary. The constructing unit is configured to construct an initialized joint dictionary according to the initialized dictionary, and construct a target matrix according to the second patch. The initialized joint dictionary includes the low-dose PET dictionary, the MR dictionary, and the standard-dose PET dictionary. The target matrix includes a second patch of the low-dose PET image, a second patch of the MR image, and a second patch of the standard-dose PET image. The iteration unit is configured to obtain a sparse code according to the target matrix, iteratively update the sparse code and the initialized joint dictionary based on a K-SVD idea until an iteration stop condition is met, and obtain the first joint dictionary including a first low-dose PET dictionary, a first MR dictionary, and a first standard-dose PET dictionary. The iteration unit further includes an iteratively updating unit and a sample selecting unit. The iteratively updating unit is configured to first update the sparse code with the dictionary fixed, and then update the dictionary with the sparse code fixed in each iteration. The sample selecting unit is configured to randomly select partial samples to perform sparse coding and dictionary updating in each iteration. The iteration unit is a core processing unit, and uses the K-SVD idea to iteratively update the sparse code and the dictionary, so that image restoration accuracy is ensured. In addition, the iteration unit is also provided with the sample selecting unit, which is configured to randomly select partial samples to perform the sparse coding and the dictionary updating in each iteration, so as to improve training efficiency while ensuring training accuracy.

Specifically, the image restoring unit is configured to restore the low-dose PET image to a standard-dose PET restored image according to the first joint dictionary obtained by the joint dictionary obtaining unit. The image restoring unit is a final restoring module. Firstly, the image restoring unit performs the blocking processing on the low-dose PET image and the MR image to obtain a third patch, and then maps a third patch of the low-dose PET image and a third patch of the MR image to imaging space of the standard-dose PET image through the mapping matrix M to obtain the third patch after mapping, namely, a fourth patch. Secondly, the low-dose PET dictionary and the MR dictionary obtained by the joint dictionary obtaining unit are merged into a joint dictionary, and a second sparse code is obtained with reference to the fourth patch. Finally, a corresponding prediction patch is predicted through the standard-dose PET dictionary and the obtained second sparse code, and the prediction patch is restored to a two-dimensional lattice again to obtain a final standard-dose PET restored image. The final standard-dose PET restored image is a restored image of the low-dose PET image.

This embodiment provides a low-dose PET image restoration system on the basis of the low-dose PET image restoration method provided in Embodiment 1. The method in Embodiment 1 can effectively solve the problems of serious noise and loss of details of the low-dose PET image, and improve image restoration efficiency and image restoration accuracy.

Embodiment 3

Figure 5:
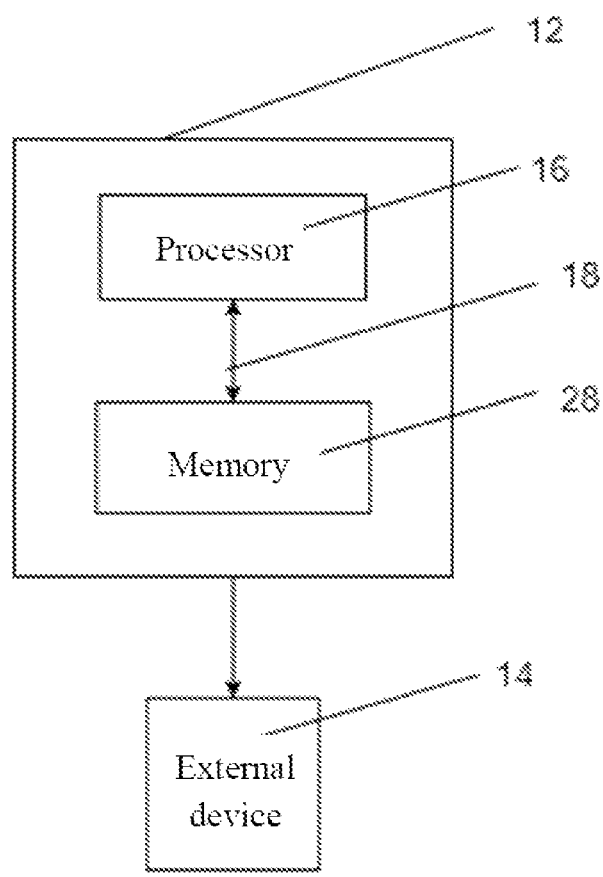
FIG. 5 is a schematic diagram of the application of a low-dose PET image restoration method to a computer device according to the present application.

FIG. 5 is a schematic diagram of a structure of a computer device according to Embodiment 3 of the present application. The computer device 12 shown in FIG. 5 is only an example and should not impose any limitations on functionality and scope of use of embodiments of the present application.

As shown in FIG. 5, the computer device 12 is in a form of a general-purpose computing device. Components of the computer device 12 may include, but are not limited to, one or more processors or processing units 16, a system memory 28, and a bus 18 that connects different system components (including the system memory 28 and the processing unit 16). The computer device 12 typically includes a variety of computer system readable media. These media may be any available media that can be accessed by the computer device 12 and includes volatile and nonvolatile media, and removable and immovable media. The system memory 28 may include the computer system readable media in a form of a volatile memory.

The computer device 12 may also communicate with one or more external devices 14 (such as a keyboard, a pointing device, and a display), with one or more devices that enable a user to interact with the computer device 12, and/or with any device that enables the computer device 12 to communicate with one or more other computing devices.

The processing unit 16 runs a program stored in the system memory 28 to perform a variety of function applications and data processing, for example, to implement a low-dose PET image restoration method provided in Embodiment 1 of the present application. The method includes the following steps.

In S1, blocking processing is performed on training images including a low-dose PET image, an MR image, and a standard-dose PET image to obtain a first patch, and first preprocessing is performed on the first patch to obtain a second patch. In S2, a first joint dictionary is obtained by sparse coding and dictionary updating according to the second patch. In S3, the low-dose PET image is restored to a standard-dose PET restored image according to the first joint dictionary.

The S2 specifically includes the following steps. In S21, the initialized dictionary including the low-dose PET dictionary, the MR dictionary, and the standard-dose PET dictionary is obtained by taking the second patch as a sample. In S22, an initialized joint dictionary is constructed according to the initialized dictionary, and a target matrix is constructed according to the second patch. In S23, a sparse code is obtained according to the target matrix, the sparse code and the initialized joint dictionary are iteratively updated until an iteration stop condition is met, and the first joint dictionary including a first low-dose PET dictionary, a first MR dictionary, and a first standard-dose PET dictionary is obtained. Each iteration includes first updating the sparse code with the dictionary fixed, and then updating the dictionary with the sparse code fixed. Partial samples are randomly selected for sparse coding and dictionary updating in each iteration.

The S3 specifically includes the following steps. In S31, blocking processing is performed on the low-dose PET image and the MR image to obtain a third patch, and second preprocessing is performed on the third patch to obtain a fourth patch. In S32, the first low-dose PET dictionary and the first MR dictionary obtained in the S2 are merged into a second joint dictionary, and a second sparse code is obtained according to the fourth patch and the second joint dictionary. In S33, a prediction patch is obtained according to the first standard-dose PET dictionary and the second sparse code obtained in the S2, and the prediction patch is restored to a two-dimensional lattice to obtain a standard-dose PET restored image.

This embodiment applies a low-dose PET image restoration method to a specific computer device. The method is stored in a memory. When executing the memory, an executor runs the method to restore a low-dose PET image, so that the method is easy to use and wide in an application scope.

Certainly, a person skilled in the art may understand that the processor may also implement the technical solution of the low-dose PET image restoration method provided in any embodiment of the present application.

Embodiment 4

Embodiment 4 provides a computer-readable storage medium, having a computer program stored thereon. When executed by a processor, the program implements the steps of a low-dose PET image restoration method provided in any embodiment of the present application. The method includes the following steps.

In S1, blocking processing is performed on training images including a low-dose PET image, an MR image, and a standard-dose PET image to obtain a first patch, and first preprocessing is performed on the first patch to obtain a second patch. In S2, a first joint dictionary is obtained by sparse coding and dictionary updating according to the second patch. In S3, the low-dose PET image is restored to a standard-dose PET restored image according to the first joint dictionary.

The S2 specifically includes the following steps. In S21, the initialized dictionary including the low-dose PET dictionary, the MR dictionary, and the standard-dose PET dictionary is obtained by taking the second patch as a sample. In S22, an initialized joint dictionary is constructed according to the initialized dictionary, and a target matrix is constructed according to the second patch. In S23, a sparse code is obtained according to the target matrix, the sparse code and the initialized joint dictionary are iteratively updated until an iteration stop condition is met, and the first joint dictionary including a first low-dose PET dictionary, a first MR dictionary, and a first standard-dose PET dictionary is obtained. Each iteration includes first updating the sparse code with the dictionary fixed, and then updating the dictionary with the sparse code fixed. Partial samples are randomly selected for sparse coding and dictionary updating in each iteration.

The S3 specifically includes the following steps. In S31, blocking processing is performed on the low-dose PET image and the MR image to obtain a third patch, and second preprocessing is performed on the third patch to obtain a fourth patch. In S32, the first low-dose PET dictionary and the first MR dictionary obtained in the S2 are merged into a second joint dictionary, and a second sparse code is obtained according to the fourth patch and the second joint dictionary. In S33, a prediction patch is obtained according to the first standard-dose PET dictionary and the second sparse code obtained in the S2, and the prediction patch is restored to a two-dimensional lattice to obtain a standard-dose PET restored image.

The computer storage medium in this embodiment may be any combination of one or more computer-readable media. The computer-readable medium may be a computer-readable signal medium or a computer-readable storage medium. For example, the computer-readable storage medium may be, but is not limited to, an electric, magnetic, optical, electromagnetic, infrared, or semiconductor system, apparatus, or device, or any combination thereof. More specific examples (a non-exhaustive list) of the computer-readable storage medium include an electrical connection having one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any proper combination thereof. In this specification, the computer-readable storage medium may be any tangible medium that includes or stores a program, and the program may be used by or in combination with an instruction execution system, apparatus, or device.

This embodiment applies a low-dose PET image restoration method to a computer-readable storage medium, having a computer program stored thereon. When executed by a processor, the program implements the steps of the low-dose PET image restoration method provided in the present application. The method is simple and quick, easy to store, and difficult to lose.

The prior art generally has problems such as poor restoration effect, complex restoration process, and low restoration accuracy for low-dose PET image restoration. This causes problems such as poor quality of a restored image, long restoration time, and absence of restored image contents. Therefore, a restoration method for a low-dose PET image is required. The restoration method can solve the problems of serious noise and loss of details, and can improve image restoration efficiency and image restoration accuracy.

In summary, the present application provides a low-dose PET image restoration method and system, a device, and a medium. The present application solves the common defects of poor image restoration effect, complex image restoration process, low image restoration accuracy, and the like in the prior art, can solve the problems of serious noise and loss of details of a low-dose PET image, and improve image restoration efficiency and image restoration accuracy. The low-dose PET image is restored to a standard-dose PET image through dictionary learning and a sparse matrix, which overcomes a disadvantage of a conventional method that details cannot be reserved during denoising. An online learning related concept is adopted, and a smaller training sample is randomly obtained in a learning process. In comparison with the conventional technology, a convergence speed is improved while accuracy is ensured. The low-dose PET image restoration method is applied to a specific system, a computer device, and a computer storage medium. Embodying the method is of great significance to the development of the medical imaging.

A person of ordinary skill in the art should understand that modules or steps of the present application described above may be implemented by a general-purpose computing device. The modules or steps may be centralized in a single computing device or distributed over a network consisting of a plurality of computing devices. Optionally, the modules or steps may be implemented by a program code that can be executed by the computing device, so that the modules or steps may be stored in a storage device and executed by the computing device. Alternatively, the modules or steps may be implemented by separately manufacturing them into various integrated circuit modules or manufacturing a plurality of them into a single integrated circuit module. Therefore, the present application is not limited to any particular combination of hardware and software.

It should be noted that the foregoing is only exemplary embodiments and technical principles of the present application. A person skilled in the art may understand that the present application is not limited to specific embodiments described herein, and a person skilled in the art may make various obvious changes, readjustments, and replacements without departing from the protection scope of the present application. Therefore, although the present application is described in detail with reference to the foregoing embodiments, the present application is not limited to the foregoing embodiments. More other equivalent embodiments may be included without departing from the concept of the present application. The scope of the present application is determined by the scope of the appended claims.

The above disclosure is only several specific implementation scenarios of the present application. However, the present application is not limited to this, and any variations that can be conceived by a person skilled in the art shall fall within the protection scope of the present application.

What is claimed is:

1. A low-dose Positron Emission Tomography (PET) image restoration method, comprising the following steps:
   S1, performing blocking processing on training images comprising a low-dose PET image, a Magnetic Resonance (MR) image, and a standard-dose PET image to obtain a first patch, and performing first preprocessing on the first patch to obtain a second patch;
   S2, obtaining a first joint dictionary by sparse coding and dictionary updating according to the second patch; and
   S3, restoring the low-dose PET image to a standard-dose PET restored image according to the first joint dictionary;
   wherein the low-dose PET image restoration method, wherein the S2 comprises the following steps:
   S21, obtaining an initialized dictionary comprising a low-dose PET dictionary, an MR dictionary, and a standard-dose PET dictionary by taking the second patch as a sample;
   S22, constructing an initialized joint dictionary according to the initialized dictionary, and constructing a target matrix according to the second patch; and
   S23, obtaining a sparse code according to the target matrix, iteratively updating the sparse code and the initialized joint dictionary until an iteration stop condition is met, and obtaining the first joint dictionary comprising a first low-dose PET dictionary, a first MR dictionary, and a first standard-dose PET dictionary.

2. The low-dose PET image restoration method according to claim 1, wherein in the S23, each iteration comprises first updating the sparse code with the dictionary fixed, and then updating the dictionary with the sparse code fixed.

3. The low-dose PET image restoration method according to claim 1, wherein in the S23, partial samples are randomly selected for the sparse coding and the dictionary updating in each iteration.

4. The low-dose PET image restoration method according to claim 1, wherein the S3 comprises the following steps:
   S31, performing blocking processing on the low-dose PET image and the MR image to obtain a third patch, and performing second preprocessing on the third patch to obtain a fourth patch;
   S32, merging the first low-dose PET dictionary and the first MR dictionary obtained in the S2 into a second joint dictionary, and obtaining a second sparse code according to the fourth patch and the second joint dictionary; and
   S33, obtaining a prediction patch according to the first standard-dose PET dictionary and the second sparse code obtained in the S2, and restoring the prediction patch to a two-dimensional lattice to obtain the standard-dose PET restored image.

5. The low-dose PET image restoration method according to claim 4, wherein the third patch, at a selected position, covers an entire image in an order of a multi-frame image.

6. The low-dose PET image restoration method according to claim 4, wherein in the S31, the second preprocessing comprises mapping a third patch of the low-dose PET image and a third patch of the MR image to imaging space of the standard-dose PET image through a preset matrix to obtain a fourth patch of the low-dose PET image and a fourth patch of the MR image.

7. The low-dose PET image restoration method according to claim 1, wherein the first patch is a one-dimensional vector generated by randomly selecting an image block from a multi-frame image and extending the image block, and the first patch comprises a first patch of the low-dose PET image, a first patch of the MR image, and a first patch of the standard-dose PET image;

the first patch is at a same position of the multi-frame image.

8. The low-dose PET image restoration method according to claim 1, wherein in the S1, the first preprocessing comprises mapping a first patch of the low-dose PET image and a first patch of the MR image to imaging space of the standard-dose PET image through a preset matrix to obtain a second patch of the low-dose PET image and a second patch of the MR image.

9. The low-dose PET image restoration method according to claim 1, wherein the S21 comprises using a K-means clustering algorithm to obtain K clustering centers as the initialized dictionary by taking the second patch as the sample, and performing normalization processing on the initialized dictionary.

10. The low-dose PET image restoration method according to claim 1, wherein in the S22, expressions of the initialized joint dictionary and the target matrix are respectively:

$$D = \begin{bmatrix} Dl \\ Dr \\ Ds \end{bmatrix}, Y = \begin{bmatrix} Yl \\ Yr \\ Ys \end{bmatrix}$$

wherein D represents the initialized joint dictionary, Y represents the target matrix, Dl represents the low-dose PET dictionary, Dr represents the MR dictionary, Ds represents the standard-dose PET dictionary, Yl represents a second patch of the low-dose PET image, Yr represents a second patch of the MR image, and Ys represents a second patch of the standard-dose PET image.

11. The low-dose PET image restoration method according to claim 1, wherein in the S23, an expression of the sparse coding comprises:

$$\operatorname*{argmin}_{X} \| Y - D\Lambda^{-1}\Lambda X \|_F^2 + \lambda \|\Lambda X\|_1$$

wherein X represents sparse coding, $\Lambda$ is a diagonal matrix, and a diagonal element of the diagonal matrix is $\Lambda^q = d^q - y_i$, wherein da is a $q^{th}$ atom of a dictionary D, $y_i$ is an $i^{th}$ element of Y, and $\lambda$ represents a sparse constraint coefficient.

12. The low-dose PET image restoration method according to claim 1, wherein in the S23, an expression of the dictionary updating comprises:

$$\operatorname*{argmin}_{D} \frac{1}{2} tr\left[ D^T D\left( \sum_i x_i x_i^T + 2\mu\psi_i \right) \right] - tr\left[ D^T\left( \sum_i y_i x_i^T + 2\mu y_i \bar{x}_i^T \right) \right]$$

wherein $y_i$ is an $i^{th}$ element of Y, $\bar{x}$ is an absolute value of each element of the sample x, $\psi_i$ is a diagonal matrix with $\bar{x}_i^T$ as a diagonal element, $y_i$ is the $i^{th}$ element of Y, and μ represents a sparse constraint coefficient.

13. The low-dose PET image restoration method according to claim 12, wherein the expression of the dictionary updating is solved by a gradient descent method; an expression of the gradient descent method is:

$$d_q^{k+1} = d_q^k - \frac{1}{a_{qq}}(D^k a_q - b_q)$$

wherein $d^q$ is a $q^{th}$ atom of a dictionary D, k is a number of iterations, ag is an element of a $q^{th}$ column of $\Sigma_i x_i x_i^T + 2\mu\psi_i$, $b_q$ is an element of a $q^{th}$ column of $\Sigma_i y_i x_i^T + 2\mu y_i \bar{x}_i^T$, and $a_{qq}$ is an element of a $q^{th}$ row and the $q^{th}$ column of $\Sigma_i x_i x_i^T + 2\mu\psi_i$.

14. A non-transitory computer-readable storage medium, wherein a computer program is stored on the non-transitory computer-readable storage medium, and the computer program implements the low-dose PET image restoration method according to claim 1 when the computer program is executed by a processor.

15. A low-dose PET image restoration system, comprising:

a sample obtaining unit, configured to perform blocking processing on training images comprising a low-dose PET image, an MR image, and a standard-dose PET image to obtain a first patch, and perform first preprocessing on the first patch to obtain a second patch;

a joint dictionary obtaining unit, configured to obtain a first joint dictionary by sparse coding and dictionary updating according to the second patch; and an image restoring unit, configured to restore the low-dose PET image to a standard-dose PET restored image according to the first joint dictionary;

wherein the joint dictionary obtaining unit comprises:

an initializing unit, configured to obtain an initialized dictionary comprising a low-dose PET dictionary, an MR dictionary, and a standard-dose PET dictionary by taking the second patch as a sample;

a constructing unit, configured to construct an initialized joint dictionary according to the initialized dictionary, and construct a target matrix according to the second patch; and an iteration unit, configured to obtain a sparse code according to the target matrix iteratively update the sparse code and the initialized joint dictionary until an iteration stop condition is met, and obtain the first joint dictionary comprising a first low-dose PET dictionary, a first MR dictionary, and a first standard-dose PET dictionary.

16. The low-dose PET image restoration system according to claim 15, wherein the iteration unit comprises:

an iteratively updating unit, configured to first update the sparse code with the dictionary fixed, and then update the dictionary with the sparse code fixed in each iteration; and a sample selecting unit, configured to randomly select partial samples to perform sparse coding and dictionary updating in each iteration.

* * * * *